(12) United States Patent
Nakanishi (10) Patent No.: US 7,339,517 B2
(45) Date of Patent: Mar. 4, 2008

(54) RADAR

(75) Inventor: Motoi Nakanishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 111 days.

(21) Appl. No.: 10/581,091

(22) PCT Filed: Oct. 24, 2004

(86) PCT No.: PCT/JP2004/015903

§ 371 (c)(1),
(2), (4) Date: May 31, 2006

(87) PCT Pub. No.: WO2005/059588

PCT Pub. Date: Jun. 30, 2005

(65) Prior Publication Data

US 2007/0103360 A1   May 10, 2007

(30) Foreign Application Priority Data

Dec. 16, 2003   (JP) .............................. 2003-418314

(51) Int. Cl.
*G01S 13/42*   (2006.01)
(52) U.S. Cl. ............................. 342/70; 342/91; 342/192
(58) Field of Classification Search ............ 342/70–73, 342/90, 91, 162, 195, 200
See application file for complete search history.

(56) References Cited

U.S. PATENT DOCUMENTS 5,892,478 A * 4/1999 Moss .......................... 342/149
2003/0222812 A1 * 12/2003 Kishida ....................... 342/109
2004/0246167 A1 * 12/2004 Kumon et al. ................ 342/70
2005/0017891 A1 * 1/2005 Kuroda et al. ................ 342/70

FOREIGN PATENT DOCUMENTS

| JP | 4-278487 | 10/1992 |
| JP | 6-214015 | 5/1994 |
| JP | 2-970950 | 5/1995 |
| JP | 7-311260 | 11/1995 |
| JP | 8-062325 | 3/1996 |
| JP | 8-226963 | 9/1996 |
| JP | 9-090024 | 4/1997 |
| JP | 11-344560 | 12/1999 |
| JP | 2003-050275 | 2/2003 |
| JP | 2003-294835 | 10/2003 |

OTHER PUBLICATIONS

International Search Report PCT/JP2004/015903 dated Dec. 14, 2004.

* cited by examiner

*Primary Examiner*—Thomas H. Tarcza
*Assistant Examiner*—Isam Alsomiri
(74) *Attorney, Agent, or Firm*—Dickstein Shapiro LLP (57) ABSTRACT

A radar wherein a first threshold value is determined in accordance with the intensity of background noise; second threshold values are set in a fixed frequency area around base portions of peaks in the frequency spectrum; the higher one of these second threshold values is adopted as a decisive threshold value in each FFT bin; and a peak exceeding this threshold value is considered a target peak and detected. Thus, the target peak caused by the reflected wave from a target included in the frequency spectrum of a beat signal is surely detected and detection accuracy of the target is increased.

12 Claims, 13 Drawing Sheets

RADAR

FIELD OF THE INVENTION

The present invention relates to a device for detecting a target by using a radio wave and more particularly to a radar for performing detection on the basis of the frequency spectrum of a beat signal between a transmission signal and a reception signal.

BACKGROUND THE INVENTION

Up to now, a radar of an FM-CW method using a milliwave band radio wave has been developed as a mobile radar. That is, the distance to a target and the relative speed to the target are determined in such a way that FM modulation is performed in a fixed frequency range around a fixed frequency in the center, a beat signal between a transmission signal and a reception signal is generated, and the beat frequency when the frequency of a transmission signal in the beat signal increases and the beat signal when the frequency of a transmission signal decreases are identified.

In order to identify the above-described up beat signal and down beat signal, the frequency spectrum of the beat signal is determined, and a fixed threshold value is set to separate signal components and noise components.

However, since the peak of beat signals in the frequency spectrum changes because of various causes, a signal and noise cannot be successfully separated only by simply setting a fixed threshold value. Accordingly, for example, a case in which a type of vehicle of a vehicle as a detection target is distinguished and a threshold value is set in accordance with the type of vehicle is disclosed in Patent Document 1.

Furthermore, a case in which a threshold value is set on the basis of a peak having the maximum power in accordance with the maximum power in a frequency spectrum changing when a rear vehicle suddenly appears in front of one's own vehicle is disclosed in Patent Document 2.

Furthermore, a case in which a threshold value is set on the basis of the power of a plurality of peaks to cope with a peak decreasing in accordance with the distance to a target is disclosed in Patent Document 3.

Moreover, a case in which a peak in a false echo image is eliminated by increasing a threshold value using the frequency of the false echo image generated by a harmonic, switching frequency, etc., is disclosed in Patent Document 4.

Patent Document 1: Japanese Unexamined Patent Application Publication No. 6-214015
Patent Document 2: Japanese Unexamined Patent Application Publication No. 7-311260
Patent Document 3: Japanese Unexamined Patent Application Publication No. 4-318700
Patent Document 4: Japanese Unexamined Patent Application Publication No. 11-344560

In the radar shown in Patent Document 1, even if the type of vehicle is distinguished, since an actual signal strength changes from the existing state of things, noise cannot be accurately removed.

Furthermore, in the radars shown in Patent Documents 2 and 3, without setting a threshold value in a value and frequency range in accordance with each peak, a small target which is originally to be detected is lost.

Moreover, in the radar shown in Patent Document 4, there is a problem in that it is able to remove only the noise whose position of appearance can be predicted in advance.

SUMMARY OF THE INVENTION

Then, it is an object of the present invention to provide a radar in which the detection accuracy of a target is increased in such a way that a spectral peak generated by a reflected wave from the target included in a frequency spectrum of a beat signal is more reliably detected on the basis of the frequency spectrum.

In the present invention, a radar for detecting a target on the basis of a peak frequency of a peak appearing in the frequency spectrum, the radar comprises means for transmitting a frequency modulated transmission signal and for generating a beat signal containing a component of a frequency equal to the difference between the frequency of a reflection signal from the target of the transmission signal and the frequency of the transmission signal; means for determining a frequency spectrum of the beat signal; and means for determining the peak frequency of a peak appearing in the frequency spectrum. The radar, includes means for setting a first threshold value on the basis of the intensity of background noise or the reflection signal intensity of a target having a fixed reflection sectional area, for setting a second threshold value in a fixed frequency region in the vicinity of each peak regarding a plurality of peaks exceeding the first threshold value appearing in the frequency spectrum, and for extracting a peak exceeding the second threshold value.

Furthermore, in the present invention, the second threshold value is heightened in a fixed band of the base portion in accordance with the expansion in the direction of the frequency axis of the peak caused by multiplication of the beat signal by a window function.

Furthermore, in the present invention, the second threshold value is heightened in a fixed band of the base portion in accordance with the expansion in the direction of the frequency axis of the peak caused by carrier/noise (C/N) characteristics of an oscillator for generating the transmission signal.

Furthermore, in the present invention, the second threshold value is set so as to be gradually lowered in the upward and downward direction from the frequency of the peak as the center.

Furthermore, in the present invention, the second threshold value is set so as to exceed the intensity of sidebands appearing together with the peak due to a modulation component superposed on the beat signal.

Furthermore, in the present invention, means for extracting the peak is to extract a peak exceeding all of the second threshold values after the second threshold value is set starting with a peak having a higher peak value than others regarding a plurality of peaks exceeding the first threshold value.

When a beat signal is multiplied by a window function, a protrusion portion (hereinafter simply referred to as a "peak") on the basis of a signal component appearing in a frequency spectrum is expanded around a frequency of the peak (hereinafter referred to as a "peak frequency") as the center in the direction of the frequency axis. According to the present invention, a first threshold value is set on the basis of the intensity of background noise or the reflection signal intensity of a target having a fixed reflection sectional area, and, regarding a plurality of peaks exceeding the first threshold value appearing in the frequency spectrum, a second threshold value which is high at a frequency in the vicinity of the peak and low at a frequency away from the peak is set in accordance with the intensity of each peak. Thus, noise in the base portion in the vicinity of the peak can be removed by the second threshold value and also noise in the frequency region where there is no peak can be removed by the first threshold value. In this way, only an original peak (hereinafter referred to as a "target peak") generated in the frequency spectrum of a beat signal caused by a reflected wave from a target can be correctly detected.

When the second threshold value is increased in accordance with the expansion in the direction of the frequency axis of the peak caused by multiplication of the beat signal by a window function in a fixed band in the base portion, the peaks appearing because of random noise superimposed on the base portion of the original peak due to the multiplication by a window function cannot be wrongly detected.

When the second threshold value is increased in accordance with the expansion in the direction of the frequency axis of the peak caused by C/N characteristics of an oscillator generating the transmission signal in a fixed band in the base portion, the peaks appearing because of random noise superimposed on the base portion of the original peak due to the multiplication of a window function cannot be wrongly detected.

When the second threshold value is set so as to be gradually lowered in the upward and downward direction from the frequency of the peak as the center, the peak generated by random noise superposed in accordance with the shape of the frequency spectrum where the closer to the original peak the frequency is, the higher the signal intensity is, is not detected, and as a result, only the original peak can be surely detected.

When the second threshold value is set so as to exceed the intensity of sidebands appearing together with the peak due to a modulation component superposed on the beat signal, sidebands of the original peak cannot be wrongly detected as a peak.

Furthermore, according to the present invention, by extracting a peak exceeding all of the second threshold values after the second threshold value has been set starting with a peak having a higher peak value than others regarding a plurality of peaks exceeding the first threshold value, an original peak can be detected with a small amount of calculations at high speed and a target detection speed is increased.

REFERENCE NUMERALS

AD converter
ADC AD converter
DAC DA converter
VOC voltage-controlled oscillator

DETAILED DESCRIPTION OF THE INVENTION

The structure of a radar according to a first embodiment is described in order with reference to FIGS. 1 to 10.

Figures 1, 2:
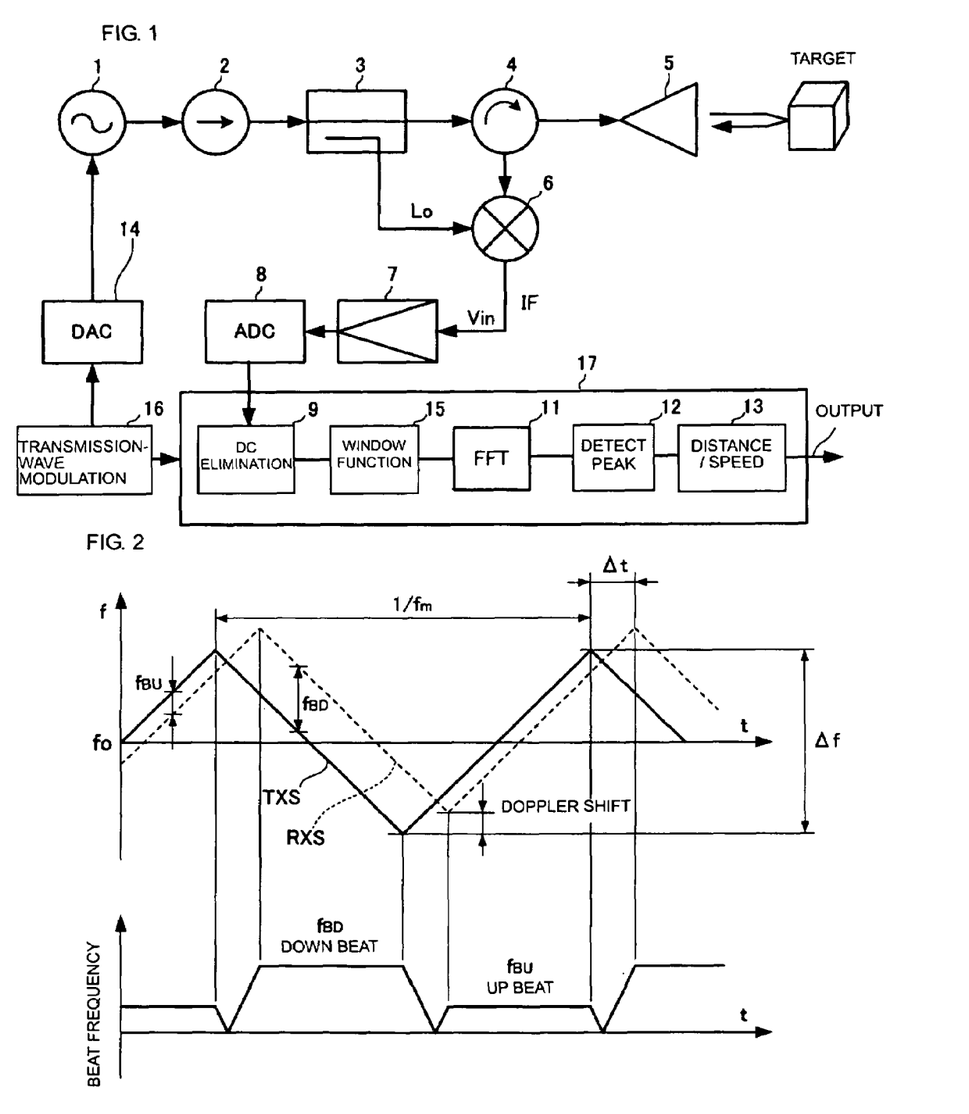
FIG. 1 is a block diagram showing the structure of a radar according to a first embodiment.
FIG. 2 shows an example of the frequency change of a transmission signal and a reception signal changing by the distance to a target of the radar and the relative speed of the target.

FIG. 1 is a block diagram showing the whole structure of the radar. A transmission-wave modulation portion 16 outputs digital data of a modulation signal to a DA converter 14 in order. A voltage-controlled oscillator VCO 1 changes the oscillation frequency in accordance with a control voltage outputted from the DA converter 14. Thus, the oscillation frequency of the VCO 1 is continuously FM modulated to generate a triangular wave. An isolator 2 transmits an oscillation signal from the VCO 1 to the side of a coupler 3 and prevents the incidence of a reflection signal to the VCO 1. The coupler 3 transmits the signal coming through the isolator 2 to the side of a circulator 4 and simultaneously gives a part, corresponding to a fixed allocation, of the transmission signal as a local signal Lo to a mixer 6. The circulator 4 transmits the transmission signal to the side of an antenna 5 and also gives a reception signal from the antenna 5 to the mixer 6. The antenna 5 transmits the FM modulated transmission signal as a continuous wave of the VCO 1 and receives a reflection signal coming from the same direction. Furthermore, the antenna 5 periodically changes the direction of the beam over the range of a detection angle.

The mixer 6 mixes the local signal Lo from the coupler 3 and the reception signal from the circulator 4 to output an intermediate-frequency signal IF. An IF amplifier circuit 7 amplifies the intermediate-frequency signal with a fixed amplification degree in accordance with a frequency determined by the distance. An AD coupler 8 converts the voltage signal to a sampling data line and gives it to a DSP 17. The DSP 17 temporally stores the digital data, the amount of at least one scan (the amount of a plurality of scanning beams over a fixed range of detection angle), converted by the AD converter 8 and calculates the direction of a target from the antenna, the distance to the target, and the relative speed of the target with respect to the antenna.

In the DSP 17, a DC elimination portion determines an average value in a fixed sampling interval as a processing object in a later-stage FET in sampling data lines obtained by the AD converter 8. Since this average value is equal to a DC component to be determined by Fast Fourier Transform analysis, computations for subtracting the average value from each data in all sampling intervals are performed and the DC component is removed before the FET computation process.

Regarding the data in which the DC component is removed by the DC elimination portion 9, a window-function processing portion 15 gets data out by using a window function of a fixed shape. When the data is obtained by using the window function, the truncation error, caused when FFT computation is performed by cutting out a time waveform in a limited sampling interval, is suppressed. For example, a window-function processing such as Hanning window, Hamming window, Blackman-Harris window, etc., is performed.

A FFT computation portion 11 analyzes frequency components of the data in the above-described sampling interval multiplied by a window function.

A peak detection portion 12 detects as a peak frequency the frequency of a signal having an intensity exceeding a fixed threshold value in the frequency spectrum.

A distance/speed calculation portion 13 calculates the distance to a target and the relative speed from the detected peak frequency.

FIG. 2 shows an example of a deviation from the frequency change between a transmission signal TXS and a reception signal RXS caused by the distance to a target and the relative speed. The transmission signal TXS is a frequency-modulated signal having a center frequency fo as the frequency center to produce a triangular wave. The frequency difference between a transmission signal TXS and a reception signal RXS when the frequency of the transmission signal increases is up beat frequency fBU, and the frequency difference between a transmission signal TXS and a reception signal RXS when the frequency of the transmission signal decreases is a down beat frequency fBD. The deviation (time difference) on the time axis between the triangular waves of the transmission signal TXS and the reception signal RXS corresponds to the roundtrip time of a radio wave to a target from the antenna. Furthermore, the deviation on the frequency axis between a transmission signal TXS and a reception signal RXS is the measurement of a Doppler shift and caused by the relative speed of a target to the antenna. The values of the up beat fBU and the down beat fBD change depending on the time difference and the amount of the Doppler shift. On the contrary, the distance to a target from a radar and the relative speed of a target to the radar can be calculated by detection of the up beat and down beat frequencies.

Figure 3:
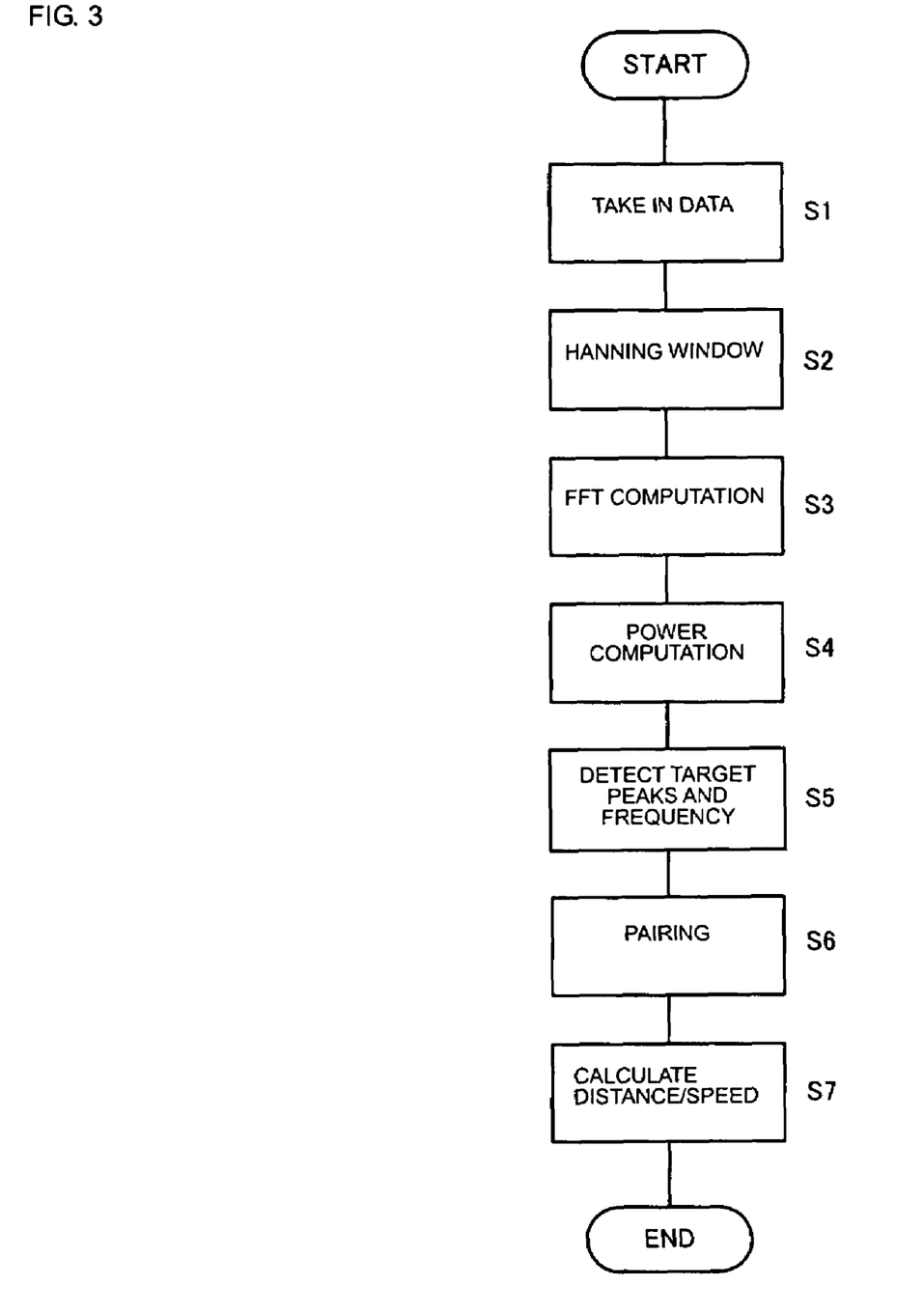
FIG. 3 is a flow chart showing the processing sequence for detection of a distance and relative speed.

FIG. 3 is a flow chart showing the processing sequence of the above-described DSP 17. First, data is taken in from the AD converter 8 (S1), the data is multiplied by a weighted coefficient of Hanning window (S2), FFT computation is performed (S3), and a power spectrum (hereinafter simply referred to as a "frequency spectrum") is calculated by taking a logarithm of the square summation of a real part and an imaginary part at each discrete frequency (S4).

In succession, a plurality of peaks in the frequency spectrum are detected, a target peak in the peaks is extracted, and a peak frequency is determined (S5).

The above processing in the upward modulation interval and downward modulation interval of a transmission frequency is performed in order. Furthermore, the combination (pairing) of the peak frequency of a plurality of protrusion portions extracted in the upward modulation interval and the peak frequency of a plurality of protrusion portions extracted in the downward modulation interval is performed (S6). That is, the peak frequencies of protrusion portions which originate in the same target are paired. Then, the relative distance and relative speed of the target are calculated from the peak frequencies (S7).

Now, when the discrete frequency spectrum of FFT, etc., of beat signals is determined, the influence of the discontinuity of signals is suppressed by multiplying the sample of a cut-out signal and a window function together.

Figure 4:
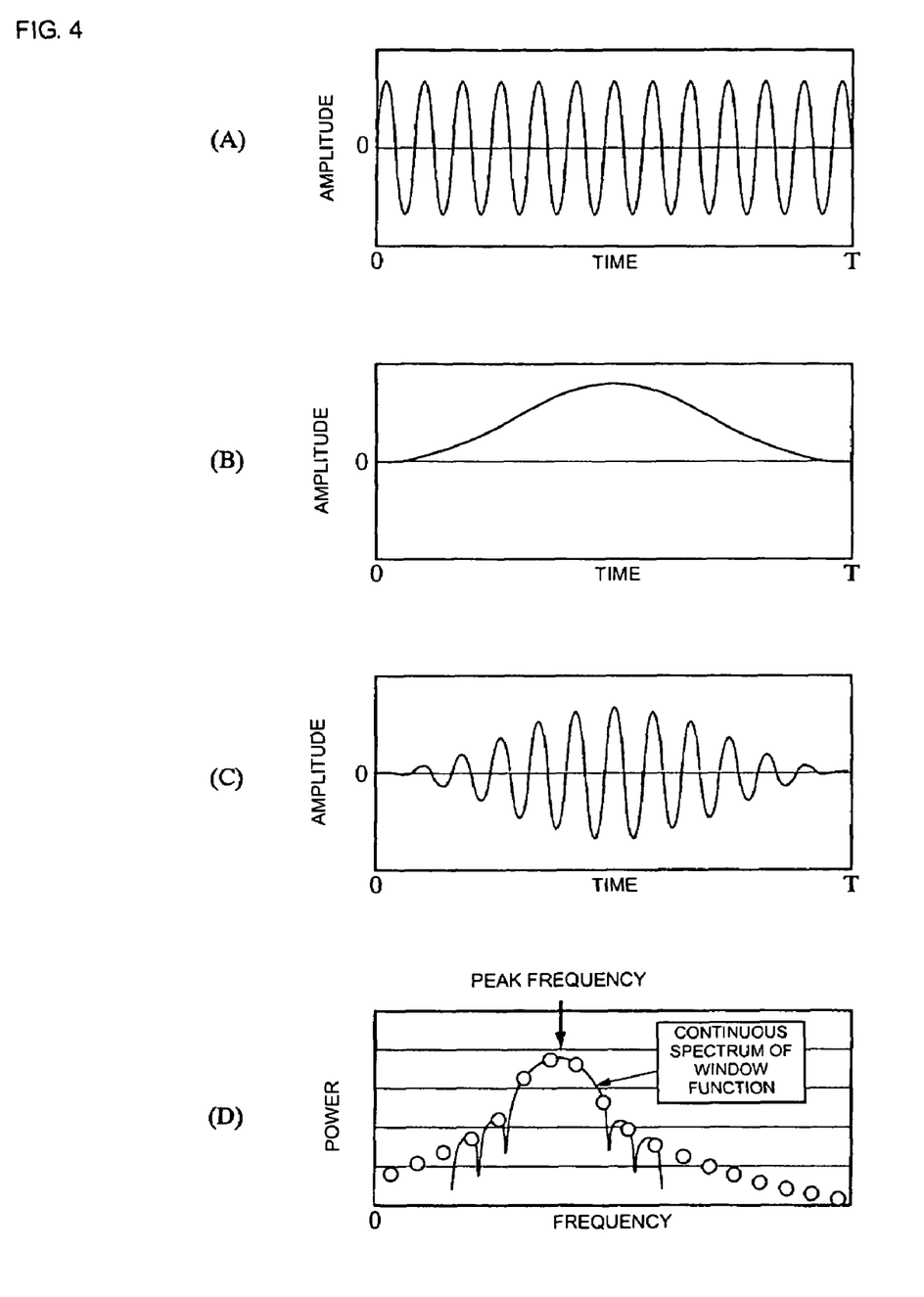
FIG. 4 shows the relation between the frequency spectrum of a window function and the expansion of the base portion of a peak.

FIG. 4 shows an example of signal processing of multiplication by a window function and a frequency spectrum as its result. Here, FIG. 4(A) shows a time waveform of a data line in which the above-described DC elimination is performed. When the data line is multiplied by a fixed window function shown in FIG. 4(B), a data line having a fixed number of data (data of a number of 1024, for example) is obtained as shown in FIG. 4(C). When FFT computation process is performed on the data line multiplied by a window function, a discrete frequency spectrum shown in FIG. 4(D) is determined.

In FIG. 4(D), the circular mark shows the signal intensity (power) at each discrete frequency. Furthermore, the solid line shows a continuous spectrum of the window function shown in FIG. 4(B). Since the frequency spectrum of the beat signal multiplied by a window function becomes the beat signal and the window function which are turned in, the spectrum expands in the direction of the frequency axis in accordance with the spectrum of the window function and the base portion is formed in the spectrum.

Figure 5:
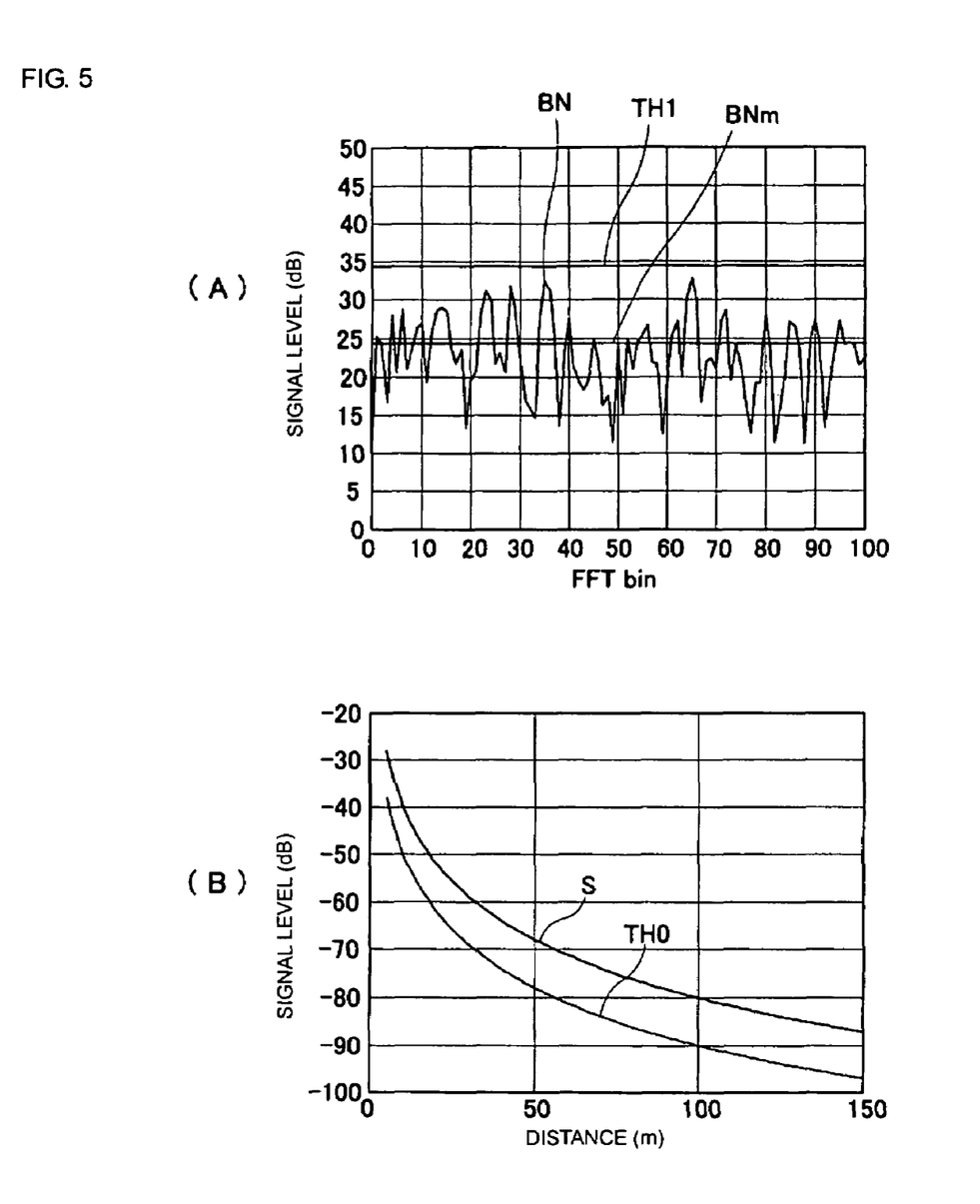
FIG. 5 shows the relation between background noise and the threshold value set by the background noise, and the relation between the reflection signal intensity of a target having a fixed reflection sectional area and the threshold value set on the basis of the reflection signal intensity.

FIG. 5 shows two examples in which a threshold value for extracting a target peak from the frequency spectrum of a beat signal is set. FIG. 5(A) shows the case in which a threshold value is set on the basis of background noise, and the relation between background noise and a threshold value set on the basis of that is shown. When a threshold value is set on the basis of background noise like this, the threshold value is determined so that the probability of the threshold value exceeding the background noise may be sufficiently small. The probability is determined by the average value and variance of background noise. In FIG. 5(A), BN represents an instantaneous value of background noise, BNm represents an average value of background noise, and TH1 represents a threshold value. The horizontal axis represents the time (elapsed time) and the vertical axis represents the signal intensity.

FIG. 5(B) shows the case in which a threshold value is set on the basis of the reflection signal intensity of a target having a fixed reflection sectional area, and shows the reflection signal intensity of a target having a fixed reflection sectional area and the threshold value which is set on the basis of the reflection signal intensity. Here, the horizontal axis represents the distance (m) to a target and the vertical axis represents the reception signal intensity (logarithmic scale) in which the peak value is 0 dB. S represents the theoretical value of a signal intensity of 10 dBsm (reception signal intensity when the reflection signal intensity from an object having a radar reflection sectional area of 10 m2 is set to be 0), and TH0 represents a threshold value in which a certain level is reduced from the theoretical value in consideration of time variation (scintillation) of the reception signal intensity. In this way, the farther the reflection signal comes from, the more the reception signal intensity is reduced, and accordingly, the threshold value is also changed in accordance with that.

However, around a target peak having a high reception signal intensity, the base portion of the peak may exceed the above-described threshold value TH1 determined on the basis of background noise or the threshold value TH0 set on the basis of the reflection signal intensity of a target having a fixed reflection sectional area, and, when the base portion is mixed with background noise, there is a case in that a peak caused by noise (hereinafter referred to as a "noise peak") is wrongly detected in that area as a peak due to a signal.

Then, first of all, the expansion of a peak due to a window function and the upper and lower limits of the variation of noise intensity to be estimated from the variance of background noise are determined. When the upper and lower limits exceed the amount of change of a fixed amount of intensity change set as the condition for the peak (protrusion portion) detection, there are cases in which the protrusion portion due to noise is detected as a peak. That is, in each range bin (each frequency range bin due to the FFT frequency resolution) excluding the target peak produced by multiplication by a window function, when the intensity of a certain range bin is the upper limit of the above-described upper and lower range and the intensity of the neighboring range bins on both sides of that is the lower limit, the above-described certain ranger bin may be wrongly detected as a peak.

Accordingly, in the frequency range which may cause such a wrong detection, the peak of the intensity not exceeding the upper limit value of the summation of the expansion of the base portion of the peak due to a window function and the intensity of noise is processed so as not to be regarded as a reflection signal from the target.

Accordingly, apart from the threshold value TH1 determined on the basis of background noise, a threshold value TH2 is set so as to exceed the upper limit value of the summation of noise and the window function spectrum, and then, a signal exceeding both is detected as a reflection signal from the target.

The way of expansion of the base of a frequency spectrum is different depending on the kind of window function. Furthermore, it is required to note that the way of expansion of the base of a spectrum is different between the case where the target peak position of a frequency spectrum is in agreement with the FFT ranger bin position and the case where both positions are different from each other (for example, when the frequency resolution of the FFT is 1 kHz, there is the beat frequency at a frequency which is not an integral multiple of 1 kHz). In consideration of these, the case in which the base is most expanded because of the target peak position and the expansion of the spectrum is used as the reference.

Figure 6:
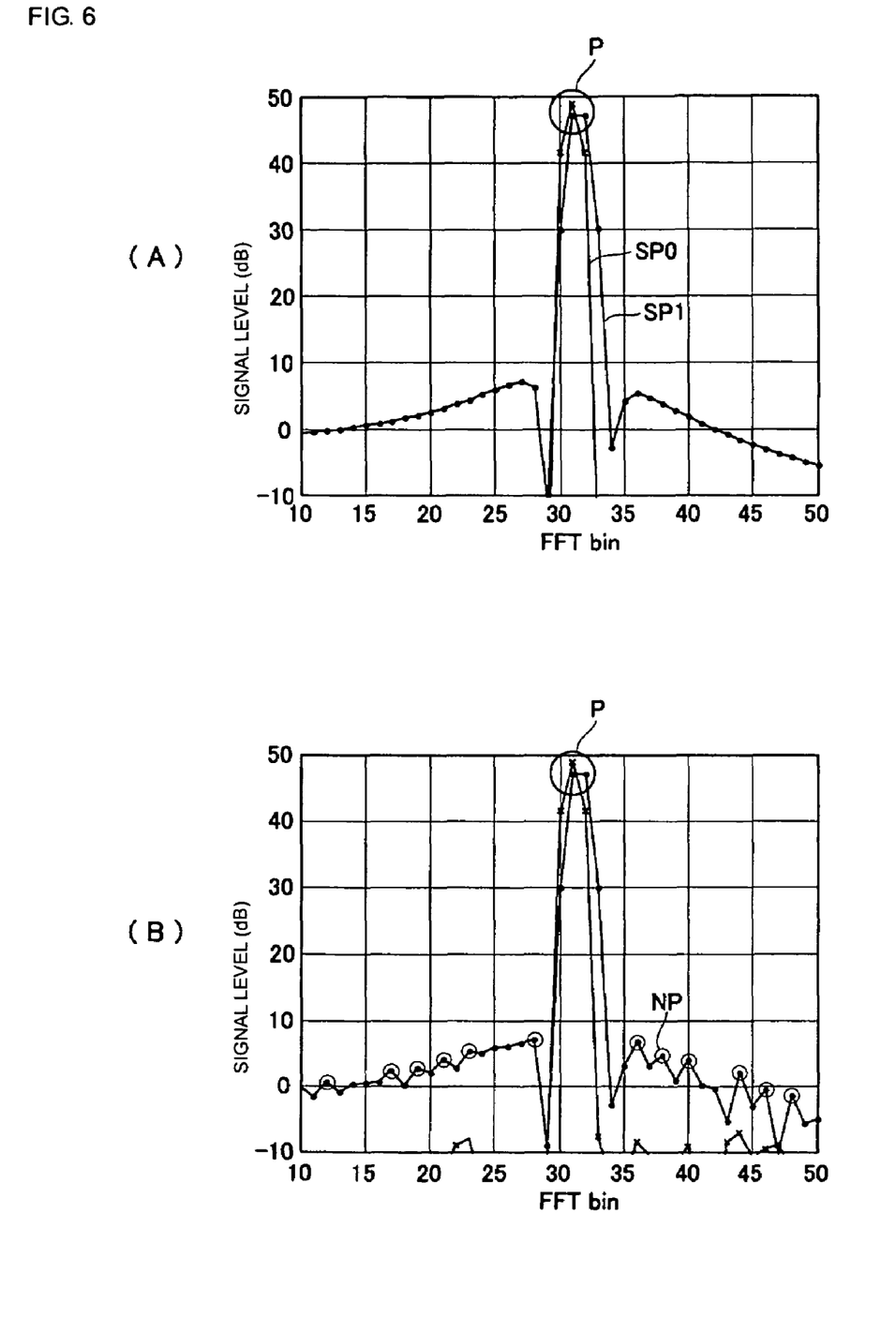
FIG. 6 shows an example of noise peaks caused by noise superposed on the base portion in the vicinity of a peak.

FIG. 6 shows the state of the base of a spectrum due to a window function and more particularly the appearance of noise peaks caused by added noise.

FIG. 6(A) shows the shape of the expansion of the base portion in the vicinity of the peak due to a window function. Furthermore, FIG. 6(B) shows a spectrum which appears due to the synthesis of the expansion of the base portion in the vicinity of the peak due to a window function and noise. In these drawings, the spectrum SP0 indicated by the cross mark shows the case where the target peak position of a frequency spectrum is in agreement with the position of a FFT range bin, and the spectrum SP1 shows the case where both positions are displaced half a range from each other. The P represents a target peak and NP represents a noise peak. When these noise peaks exceed the above-described threshold value TH1 determined on the basis of background noise, these noise peaks NP are wrongly detected as a target peak.

Then, regarding the base portion of the peak, a threshold value different from the threshold value (first threshold value) TH1 is determined.

Figure 7:
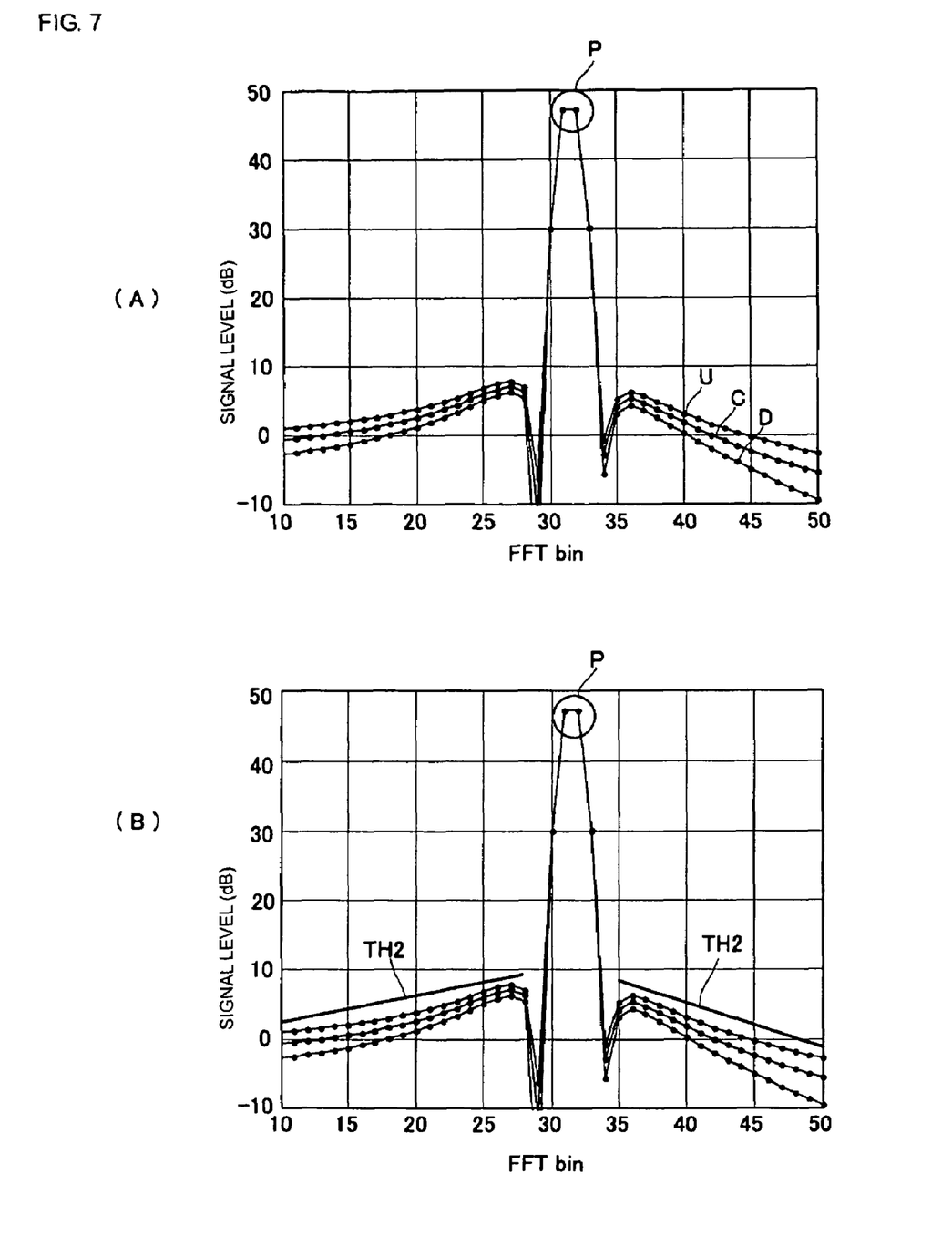
FIG. 7 shows an example of a threshold value set in the base portion in the vicinity of a peak.

FIG. 7 shows an example of the range of variation of noise intensity in the vicinity of the peak due to the expansion of the spectrum of a window function and mixing of noise. In FIG. 7(A), C represents a theoretical value, U represents the level of the upper limit due to the mixing of noise, and D represents the level of the lower limit due to the mixing of noise. Then, as shown in FIG. 7(B), a second threshold value TH2 exceeding the level of the upper limit is set in consideration of the mixing of noise.

However, since, in peaks in the frequency spectrum of a beat signal, it is not clear which is a target peak or a noise peak, determination of the base portion of the peak on which the threshold value TH2 is set is needed. Then, the following is performed.

Figure 8:
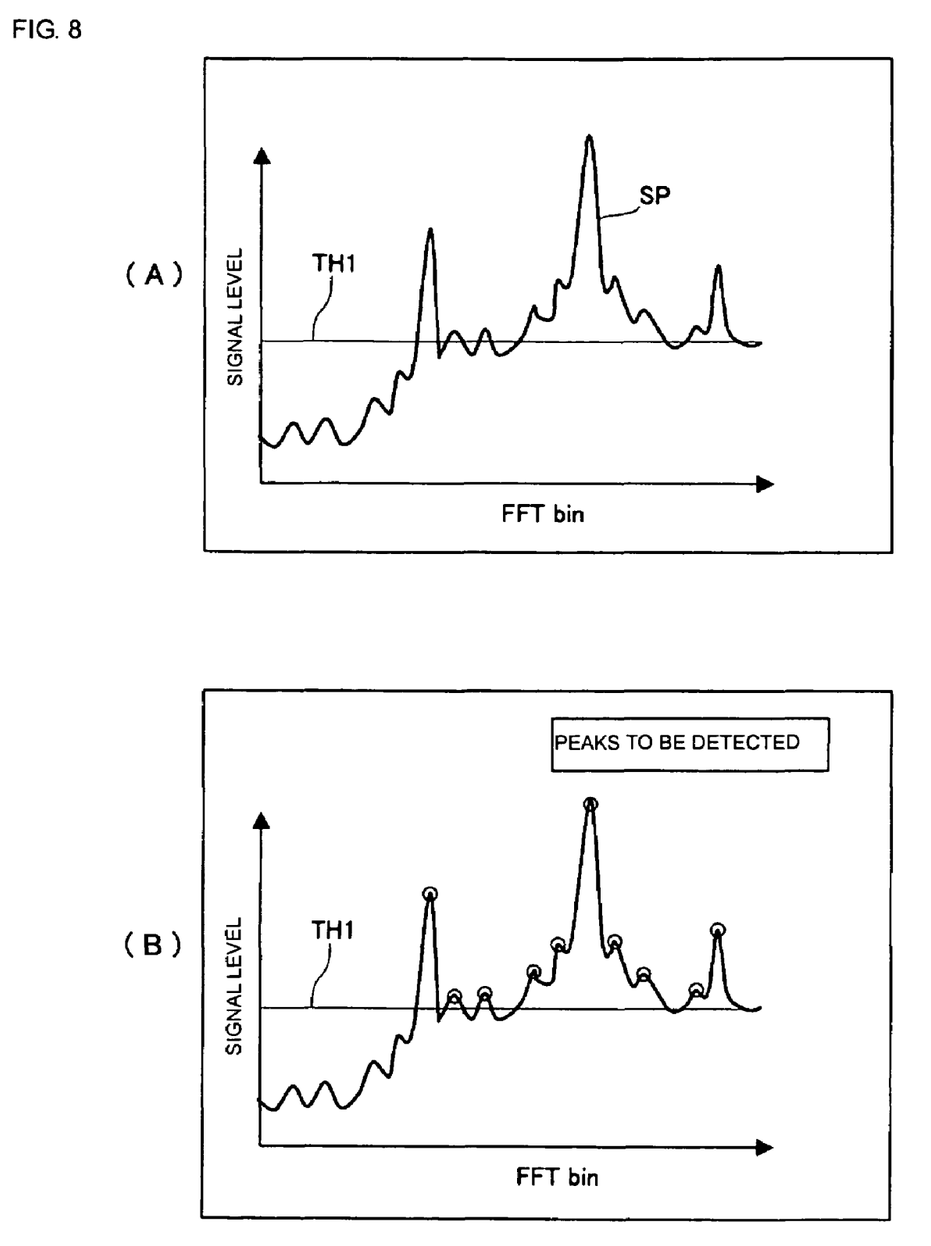
FIG. 8 shows the relation between a threshold value set on the basis of background noise and peaks to be detected.

FIG. 8 shows an example of a frequency spectrum having a plurality of peaks. Here, the waveform SP is a frequency spectrum and the straight line TH1 is a threshold value set on the basis of the average value and variance of background noise of a spectrum. The background noise is background noise included in a beat signal in which a reflection signal from a target is not contained, and, in a design stage or manufacturing stage, the average value and variance are determined and the threshold value TH1 is determined in advance so that the probability that background noise as random noise exceeds the threshold value may be sufficiently small.

The positions indicated by the circular mark in FIG. 8(B) shows the peak positions in which the change of a signal intensity to the frequency change is of an angular shape in the range exceeding the threshold value TH1. If all of the peak positions are real peaks in the range exceeding the threshold value TH1, the peaks indicated by the circular mark are also detected as target peaks. Then, a plurality of peaks exceeding the threshold value TH1 is detected and the threshold value TH2 is set for a peak having a higher peak value in order.

Figure 9:
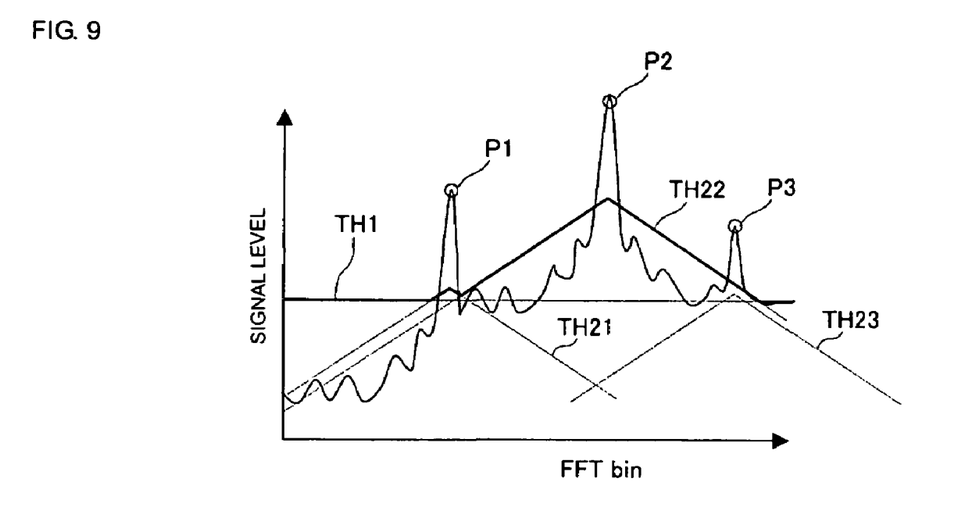
FIG. 9 shows an example of a threshold-value line being lastly set.

FIG. 9 shows the example. Here, the threshold value TH1 is a threshold value determined on the basis of background noise as described above, the threshold value TH22 is a threshold value determined on the basis of the peak value of a peak P2, and the threshold value TH21 is a threshold value determined on the basis of the peak value P1. In the same way, the threshold value TH23 is a threshold value determined on the basis of the peak value of a peak P3. As shown by a solid line in FIG. 9, a threshold-value line is determined by selecting a threshold value having a higher value in a plurality of threshold values. Accordingly, a peak exceeding the threshold-value line is detected as a target peak.

Figure 10:
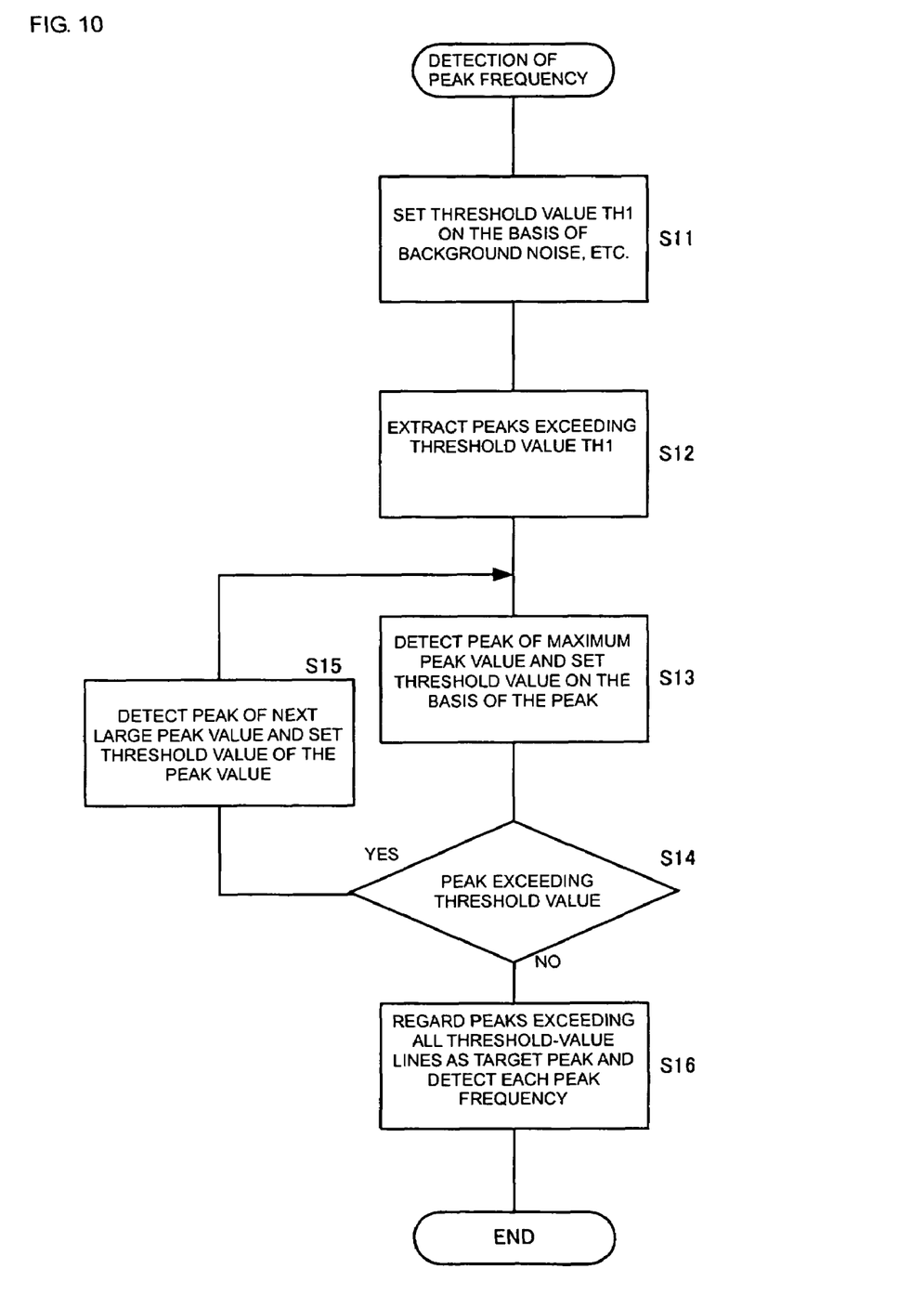
FIG. 10 is a flow chart showing the processing sequence for peak frequency detection.

FIG. 10 shows the processing sequence of a peak frequency detection corresponding to step S5 in FIG. 3.

First, a threshold value TH1 is determined from the average value and variance of background noise, and peaks exceeding the threshold value TH1 in a plurality of peaks are extracted (S11 to S12). In succession, a peak having the maximum peak value is detected in the peaks and a threshold value (TH22 in the example in FIG. 9) is set on the basis of the peak value (S13). After that, the presence of peaks exceeding the threshold value (TH22) is decided, and, if they are present, a peak having the next largest peak value is detected and a threshold value (TH21 in the example in FIG. 9) is set on the basis of the peak value.

After that, the same processing is repeated and, regarding all peaks exceeding a plurality of threshold values determined in consecutive order, a threshold value is set (S14→S15→S13→. . . ). Peaks exceeding the plurality of threshold values determined in this way (P1, P2, and P3 in the example shown in FIG. 9) are considered as target peak (S16).

In the above-described processing, the one having a higher value between the threshold value TH2 set in each base portion on the basis of the peak value of each peak and the threshold value TH1 determined from the average value and variance of background noise in each range bin is adopted as a threshold value, and a peak lower than the threshold value is processed as a noise peak. However, as described above, when a threshold value is set in the base portion in the higher order in peak value, noise peaks can be effectively shaken off.

Moreover, with the inclusion of not only the threshold value TH2 set on the basis of the peak value of the detected peak and the threshold value TH1 determined from the average value and variance of background noise, but also the threshold value TH0 set on the basis of the reflection intensity from a target of a fixed reflection sectional area as shown in FIG. 5(B), the processing of adopting a higher value as a threshold value in each range bin may be performed.

Figure 11:
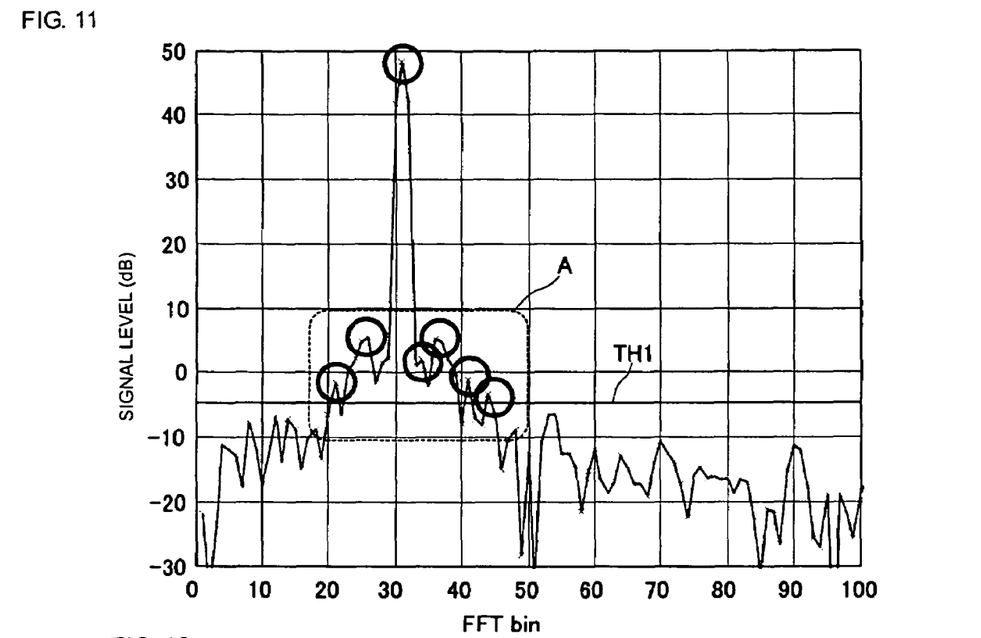
FIG. 11 shows an example of noise peaks generated in the base portion in the vicinity of a peak by C/N characteristics of an oscillator in a radar according to a second embodiment.
Figure 12:
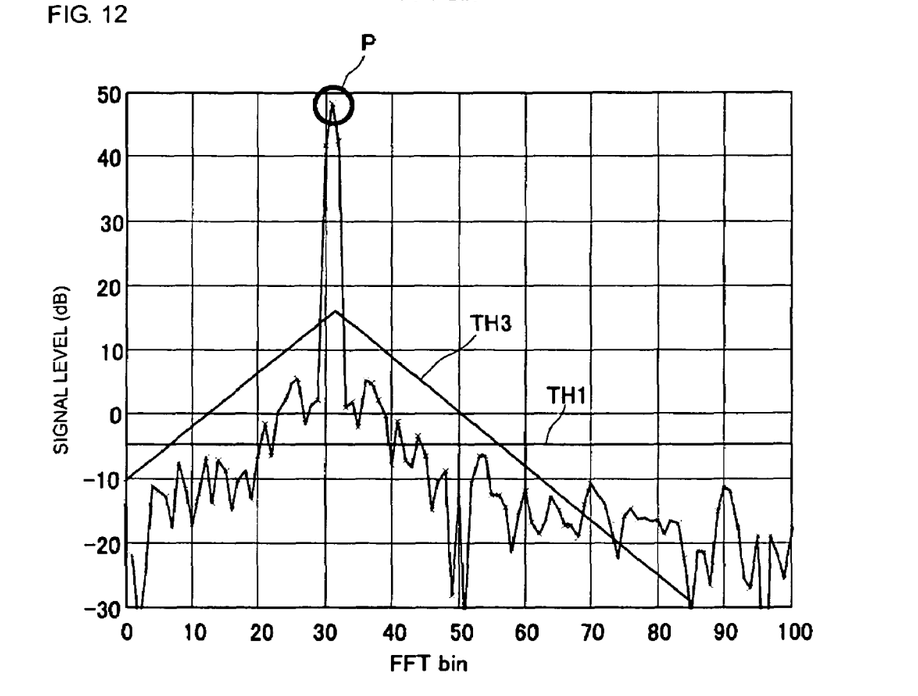
FIG. 12 shows an example for setting a threshold value in the radar.

Next, a radar according to a second embodiment is described on the basis of FIGS. 11 and 12.

In a radar of a FM-CW method, when C/N characteristics of an oscillator generating a transmission signal and local signal are worsened, the base in the vicinity of a peak which appears in the frequency spectrum of a beat signal is widened in accordance with that. That is, the more the noise component is included in the oscillation signal, the more the base portion of the peak is expanded in the direction of the frequency axis. Because of this influence, many peaks of a low intensity caused by noise appear in the vicinity of a peak having a large peak value, and there is a fear in that these are wrongly recognized as target peaks.

Then, in the same way as the case of the first embodiment, a threshold level is set to a level (level which noise does not exceed with a fixed probability) exceeding the maximum value of a level to which the level of the base portion in the vicinity of a peak due to C/N characteristics and random noise are synthesized.

FIG. 11 shows the state of a frequency spectrum produced by the synthesis of the expansion of the spectrum in the base portion in the vicinity of a peak due to C/N characteristics of an oscillator and background noise.

If a peak is detected using only a threshold value TH1 determined on the basis of background noise shown in FIG. 11, peaks shown by a plurality of circular marks contained in the portion encircled by a broken line A in the drawing are wrongly detected as target peaks.

Then, as shown in FIG. 12, the higher one between a threshold value TH3 determined on the basis of the peak value of a peak P and C/N characteristics of the oscillator and a threshold value TH1 determined on the basis of background noise is used as a threshold value of the whole. In this way, the wrong detection of peaks generated by random noise superposed on the base portion in the vicinity of a peak because of the influence of noise superposed on an oscillation signal can be prevented.

Moreover, when such a threshold value is set, in the same way as in the first embodiment, first, a plurality of peaks exceeding a threshold value TH1 determined on the basis of background noise are detected, the plurality of peaks is checked in order starting with a peak having higher peak value, and the process may be repeated until a peak exceeding a threshold value runs out.

Figure 13:
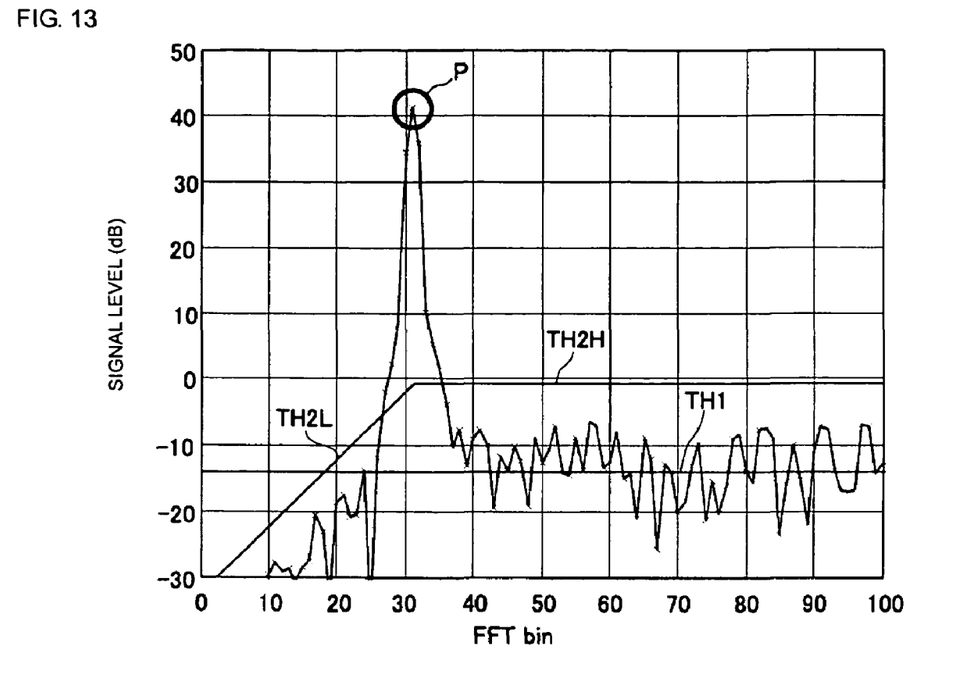
FIG. 13 shows an example for setting a threshold value in a radar according to a third embodiment.

Next, a radar according to a third embodiment is described on the basis of FIG. 13.

The amplification degree of the IF amplifier circuit 7 shown in FIG. 1 is changed by the frequency determined in proportion to the distance to a target of an IF signal as a beat signal. In the IF amplifier circuit 7, the farther a reflection signal comes from, that is, the higher the frequency is, the more the amplification degree of the reception signal is increased. Accordingly, background noise also tends to increase as the frequency increases.

FIG. 13 shows an example of a frequency spectrum in that case. In the example, a peak P is produced in a range bin 31, and, although the base portion on the lower-frequency side than that relatively rapidly decreases, noise of a high noise level appears on the higher-frequency side. Then, a threshold value determined on the basis of the peak value of a peak P is relatively rapidly decreased on the lower-frequency side as shown by the threshold value line TH2L in consideration of the characteristics of the correction of the distance-dependent decrease, and, as shown by the threshold value line TH2H, the decrease is made slow on the higher-frequency side. However, in the example in FIG. 13, the threshold value line TH2H on the higher-frequency side is made substantially constant (inclination is substantially zero).

Moreover, also, when such a threshold value is set, in the same way as in the case of the first embodiment, first, a plurality of peaks exceeding a threshold value TH1 determined on the basis of background noise are detected, the plurality of peaks is checked in order starting with a peak having a higher peak value, and the process may be repeated until a peak exceeding a threshold value runs out.

Figure 14:
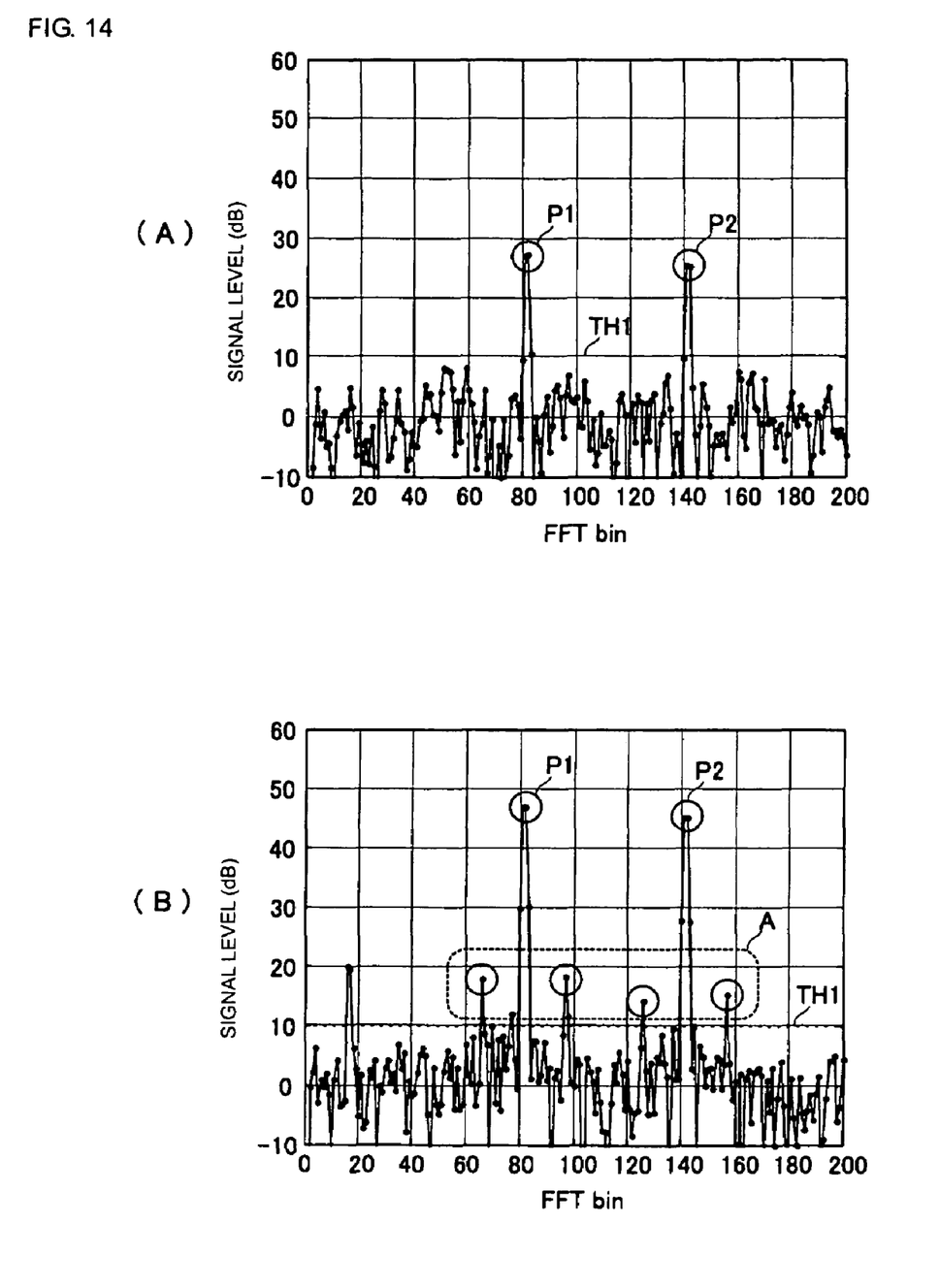
FIG. 14 shows an example of a spectrum when an AM modulation component is contained in a beat signal in a radar according to a fourth embodiment.
Figure 15:
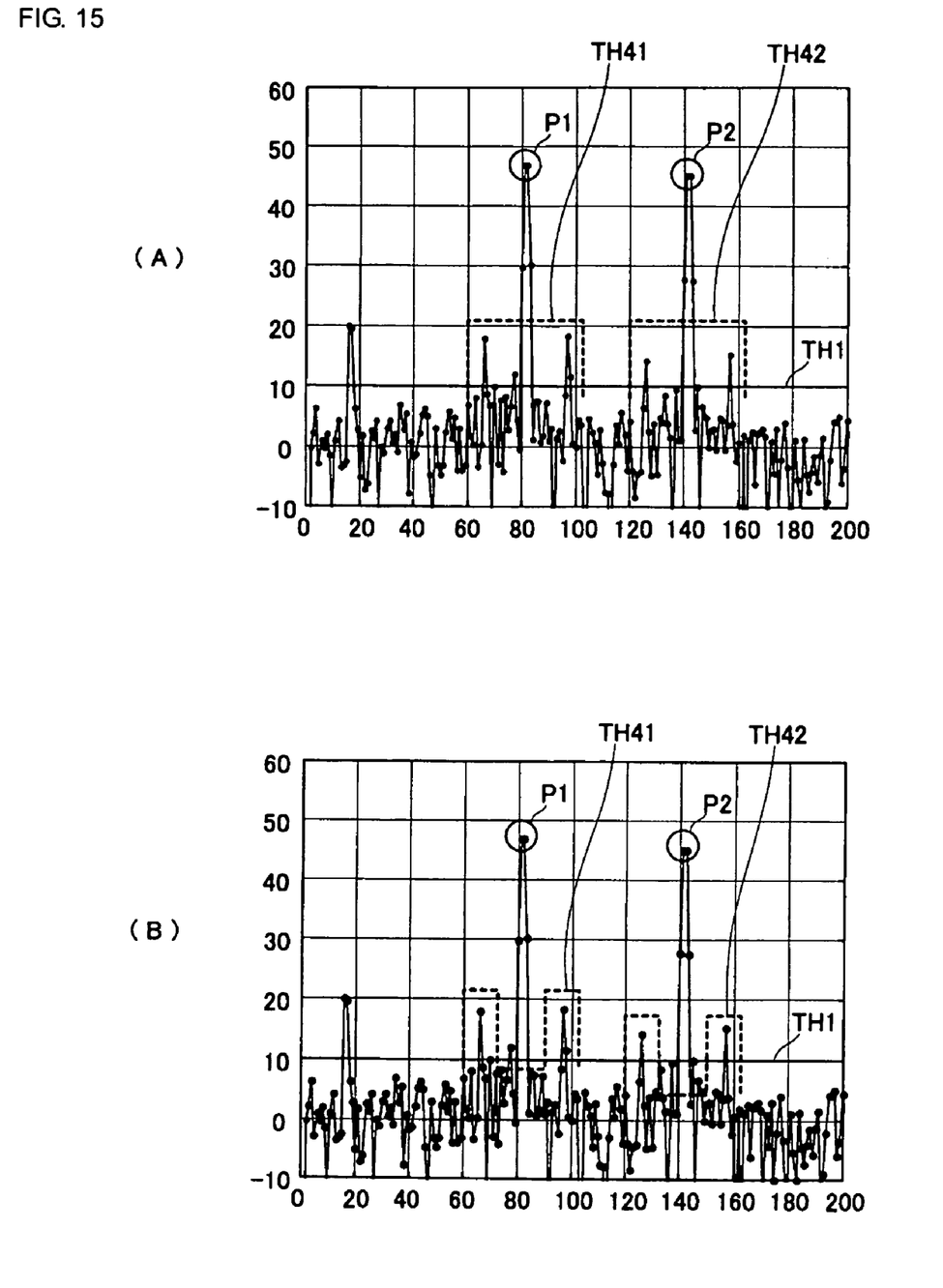
FIG. 15 shows an example of a threshold value set on the basis of sideband noise contained in the same beat signal.

Next, a radar according to a fourth embodiment is described on the basis of FIGS. 14 and 15.

In a radar of an FM-CW method, there is a case in which signals in a switching power supply, a clock oscillator of a signal processing circuit and beam scanning mechanism, etc., are mixed into a reception stage. Because of this, in the beat signal, an FM or AM modulation component except an original beat signal between a reflection wave form from a target and a transmission signal and the sideband component is produced as a spurious signal. When the peak value of an original target peak is high, even if the FM or AM modulation component is suppressed to a lower level in comparison with the level of the original beat signal, the peak of the sidebands exceeds the threshold level and is wrongly detected as a target peak.

FIGS. 14(A) and (B) are the cases in which an AM modulation component is contained in the beat signal, FIG. 14(A) is the case in which the S/N ratio is relatively small and the peak value of a target peak is relatively small, and FIG. 14(B) is the case in which the S/N ratio is relatively large and the peak value of a target peak is relatively large.

In this way, when the peak value of target peaks P1 and P2 is relatively low and the intensity of background noise is high, since a threshold value TH1 determined on the basis of background noise is high and the sideband component is small, the peak due to the sideband does not exceed the threshold value TH1. However, as shown in FIG. 14(B), since the peak value of target peaks P1 an dP2 is high and the intensity of background noise is low, when the threshold value TH1 is low, peaks due to the sideband indicated by circular marks exceeding the threshold value TH1 are wrongly detected in the portion A in the vicinity of the target peaks.

However, since the spectrum of a signal source generated as noise inside a device is substantially constant, the location and intensity of a sideband to be generated in the vicinity of a target peak due to the signal source can be produced. Then, as shown in FIG. 15, a threshold value which the peak of sidebands does not exceed is set in the vicinity of a peak.

In FIG. 15(A), a threshold value is increased in a frequency range where sidebands are generated in the vicinity of peaks. That is, a threshold value TH41 is set at an intensity exceeding the intensity of sidebands predicted in accordance with the peak value of a detected peak P1. In the same way, a threshold value TH42 is set at an intensity exceeding the intensity of sidebands predicted in accordance with the peak value of a peak P2.

Furthermore, in FIG. 15(B), a threshold value is increased only at a location of a predicted sideband.

Moreover, when such a threshold value is set, in the same way as in the first embodiment, first, a plurality of peaks exceeding a threshold value TH1 determined on the basis of background noise are detected, the plurality of peaks is checked in order starting with a peak having a higher peak value, and the process may be repeated until a peak exceeding a threshold value runs out.

In this way, it is able to prevent the noise peak due to sidebands generated by a modulation component from being wrongly detected as a target peak.

The invention claimed is:

1. A radar for detecting a target, the radar comprising:
   a transmitter, the transmitter transmitting a frequency modulated transmission signal;
   an intermediate-frequency signal generator, the intermediate-frequency signal generator generating a beat signal containing a component of a frequency equal to a difference between a frequency of a reflection signal from the target and a frequency of the transmission signal; and
   a digital signal processor, the digital signal processor determining a frequency spectrum of the beat signal, determining a peak frequency of a peak appearing in the frequency spectrum, setting a first threshold value based on one of intensity of background noise or intensity of the reflection signal from a target having a fixed reflection sectional area, setting a second threshold value in a fixed frequency region in the vicinity of the peak based on a plurality of additional peaks exceeding the first threshold value, and extracting the peak exceeding the second threshold value.

2. The radar as claimed in claim 1, wherein the second threshold value is heightened in a fixed band of a base portion of the peak expanded in a direction of a frequency axis of the peak caused by multiplication of the beat signal by a window function.

3. The radar as claimed in claim 1, wherein the second threshold value is heightened in a fixed band of a base portion of the peak expanded in a direction of a frequency axis of the peak caused by carrier/noise characteristics of an oscillator generating the transmission signal.

4. The radar as claimed in claim 1, wherein the second threshold value is gradually lowered in the upward and downward frequency direction from the frequency of the peak.

5. The radar as claimed in claim 1, wherein the second threshold value exceeds an intensity of sidebands appearing together with the peak due to a modulation component superposed on the beat signal.

6. The radar as claimed in claim 1, wherein the digital signal processor extracts the peak exceeding all of the second threshold values after the second threshold value has been set based on a peak having a higher peak value than the plurality of peaks exceeding the first threshold value.

7. The method as claimed in claim 1, wherein the second threshold value is gradually lowered in the upward and downward frequency direction from the frequency of the peak.

8. The method as claimed in claim 1, further comprising superposing a modulation component on the beat signal so that the second threshold value exceeds an intensity of sidebands appearing together with the peak.

9. The method as claimed in claim 1, further comprising extracting the peak exceeding all of the second threshold values after the second threshold value has been set based on a peak having a higher peak value than the plurality of peaks exceeding the first threshold value.

10. A method for detecting a target, the method comprising:
    transmitting a frequency modulated transmission signal;
    generating a beat signal containing a component of a frequency equal to a difference between a frequency of a reflection signal from the target and a frequency of the transmission signal;
    determining a frequency spectrum of the beat signal;
    determining a peak frequency of a peak appearing in the frequency spectrum;
    setting a first threshold value based on one of intensity of background noise or intensity of the reflection signal from a target having a fixed reflection sectional area;
    setting a second threshold value in a fixed frequency region in the vicinity of the peak based on a plurality of additional peaks exceeding the first threshold value; and
    extracting the peak exceeding the second threshold value.

11. The method as claimed in claim 10, further comprising multiplying the beat signal by a window function so as to heighten the second threshold value in a fixed band of a base portion of the peak along a frequency axis.

12. The method as claimed in claim 10, further comprising heightening the second threshold value in a fixed band of a base portion of the peak along a frequency axis based on carrier/noise characteristics of an oscillator generating the transmission signal.

* * * * *